United States Patent [19]
Han

[11] Patent Number: 6,163,387
[45] Date of Patent: Dec. 19, 2000

[54] MULTI-RESOLUTION TRANSMISSIVE AND REFLECTIVE OPTICAL SCANNER

[75] Inventor: Loi Han, Alhambra, Calif.

[73] Assignee: Microtek International Inc., Hsinchu, Taiwan

[21] Appl. No.: 09/119,354

[22] Filed: Jul. 20, 1998

Related U.S. Application Data

[63] Continuation of application No. 08/684,310, Jul. 17, 1996.

[51] Int. Cl.[7] ....................................... H04N 1/04
[52] U.S. Cl. .......................... 358/487; 358/474; 358/494; 358/496; 358/497; 358/506; 250/208.1
[58] Field of Search ..................... 358/474, 475, 358/487, 494, 496, 497, 483, 493, 505, 513, 506; 250/208.1, 234, 235; 359/368, 388

[56] References Cited

U.S. PATENT DOCUMENTS

| | | | |
|---|---|---|---|
| 3,377,913 | 4/1968 | Grant, Jr. ..................................... 88/24 |
| 3,770,887 | 11/1973 | Van Buskirk ............................ 178/6.5 |
| 4,060,322 | 11/1977 | Hirayama et al. ........................ 355/60 |
| 4,074,935 | 2/1978 | Spence-Bate .............................. 355/46 |
| 4,321,627 | 3/1982 | Hooker, III et al. ..................... 358/475 |
| 4,387,979 | 6/1983 | Ohishi et al. ........................... 355/3 R |
| 4,536,077 | 8/1985 | Stoffel ......................................... 355/8 |
| 4,623,937 | 11/1986 | Watanabe ................................. 358/285 |
| 5,016,045 | 5/1991 | Watanabe ................................. 355/43 |
| 5,117,256 | 5/1992 | Haibara ..................................... 355/77 |
| 5,140,443 | 8/1992 | Iwahara et al. .......................... 358/474 |
| 5,220,378 | 6/1993 | Kirkpatrick et al. ..................... 355/60 |
| 5,486,895 | 1/1996 | Leidig et al. ............................. 355/50 |
| 5,566,006 | 10/1996 | Yoshinaga et al. ..................... 358/475 |

*Primary Examiner*—Edward L. Coles
*Assistant Examiner*—Mark Wallerson
*Attorney, Agent, or Firm*—Small Larkin, LLP

[57] ABSTRACT

An optical, multi-resolution scanning apparatus for scanning transparent or opaque objects including a high resolution lens, a low resolution lens, a flip mirror switch which alternates between high resolution mode and low resolution mode of scanning, a flip mirror switch which alternates between transmissive mode and reflective mode of scanning whereby high and low resolution scanning of opaque and/or transparent objects may be accomplished through movement of flip mirror switches, without transverse movement of the lens assembly.

20 Claims, 11 Drawing Sheets

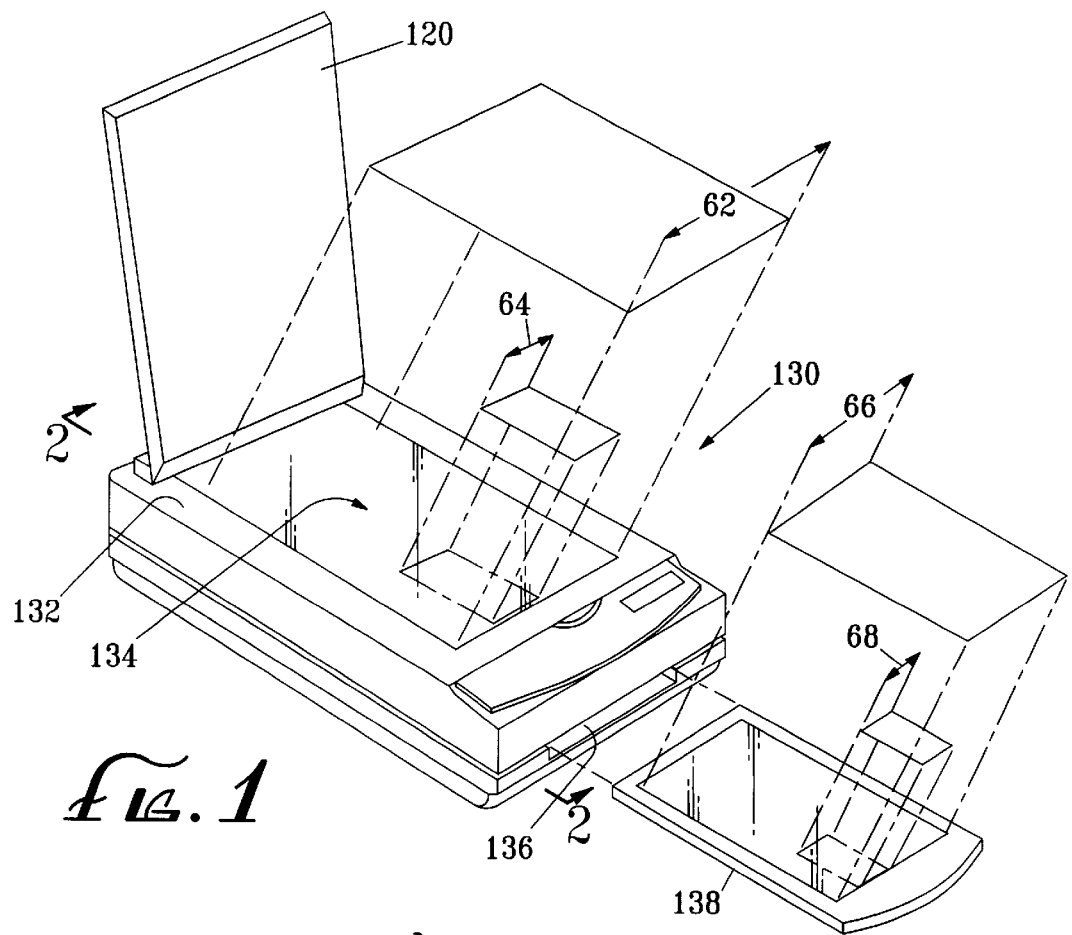
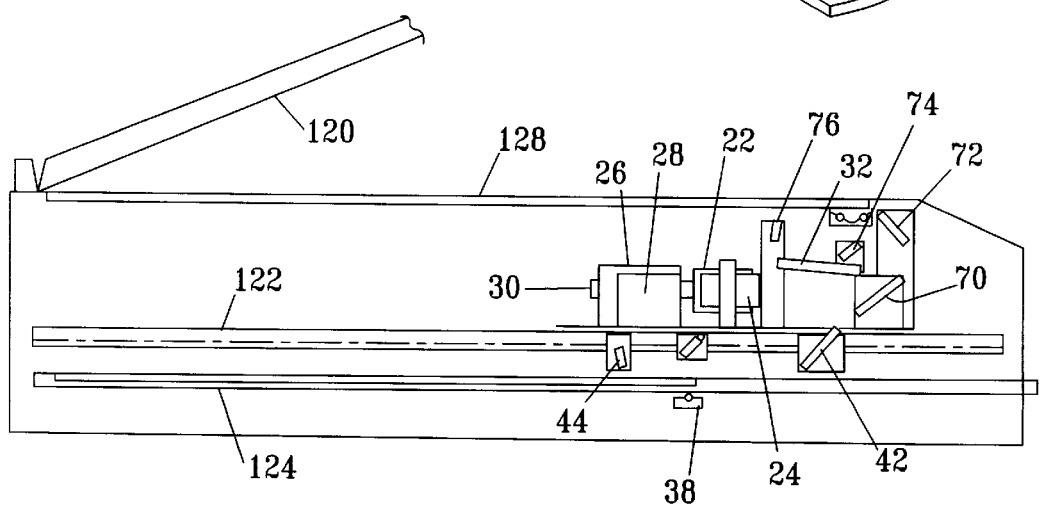

MULTI-RESOLUTION TRANSMISSIVE AND REFLECTIVE OPTICAL SCANNER

This is a continuation of application Ser. No. 08/684,310, filed Jul. 17, 1996.

FIELD OF THE INVENTION

The present invention relates to an optical scanning apparatus and, more particularly, to a multi-resolution transmissive and reflective optical scanner.

BACKGROUND OF THE INVENTION

Optical scanning apparatuses are currently in great demand as a result of the rapid development of high speed, low cost imaging devices and the ever decreasing cost of personal computers. Optical scanners, in general, are capable of reflective and/or transmissive scanning of documents, photographs and the like, whereby reflective scanning is used with opaque objects such as photographs and transmissive scanning is used with transparent objects, such as slides and the like. Reflective scanners project light onto the side of the object to be scanned. The reflected light is viewed by an optical sensor which converts the reflected light into digital code. The code is then transmitted to the operator's computer for further processing. Transmissive scanners operate on the same principle except that light is projected through the transparent object being scanned. A great demand exists for high quality, low cost, low maintenance, easy to calibrate, versatile optical scanners capable of both high and low resolution reflective and transmissive scanning.

A conventional scanner typically has scanning platform(s) and a chassis including an optical sensor, a lens assembly, a plurality of mirrors and light source(s), mounted on rails inside the scanner housing and driven by a motor within the housing to scan along the length of the document being placed on the scanning platform. During reflective operation the light source projects light upon the portion of an opaque object within the field of view of the optical sensor, with the scanner chassis moving incrementally lengthwise under a reflective scanning platform and scanning an image line by line. During transmissive operation, another light source, preferably housed under a transmissive scanning platform, within the scanner housing, provides light through a portion of a transparent object within the field of view of the optical sensor. Switching between transmissive and reflective modes may be accomplished by transverse movement of the lens assembly and/or corresponding movement of mirrors within the scanner housing, depending on the nature of object being scanned. Actual switching is controlled by the operator, who programs the scanner for the desired mode of scanning before starting the operation. A scanner which employs movable mirrors only to switch between scanning modes, is described, for example, in U.S. patent application Ser. No. 08/393,112, filed Feb. 21, 1995 (attorney docket: 5592-1016), commonly owned by applicant, and which is incorporated herein by reference. Such transmissive/reflective scanners provide scanning of objects in one resolution only. Thus, the need exists for a versatile optical scanner capable of multi-resolution transmissive and reflective scanning.

OBJECTS AND SUMMARY OF THE INVENTION

It is an object of the present invention to provide an optical scanning apparatus for multi-resolution reflective and transmissive scanning of objects.

It is an additional object of the present invention to provide an optical scanning apparatus for high and low resolution reflective and transmissive scanning of objects using an optical sensor and a dual-lens assembly.

It is another object of the present invention to provide a reflective scanning platform adapted for the reflective scanning of opaque objects and a transmissive scanning platform adapted for the transmissive scanning of transparent objects, each of the platforms being within the corresponding field of view of the optical sensor.

It is a further object of the present invention to provide optical pathways for interaction with the transmissive/reflective scanning platforms, the dual-lens assembly and the optical sensor.

It is yet another object of the present invention to provide each optical pathway with a transmissive branch, a reflective branch and an optical switch for switching between high and low resolution modes in each branch.

It is still another object of the present invention to provide an optical switch for switching between the transmissive and reflective branches in each optical pathway.

It is still a further object of the present invention to actuate the optical switches in response to an electronic signal generated by a scanner control circuit.

In accordance with the objects of the present invention, an optical scanning apparatus for retrieving images representative of objects is provided with at least one scanning platform capable of holding an object for scanning; an optical sensor; a lens assembly comprising at least two lenses; at least two optical pathways, each pathway including a plurality of mirrors defining a corresponding optical path from at least one scanning platform to said optical sensor through a corresponding one of said lenses; and an optical switch adapted to alternate between said pathways.

More particularly, the present invention provides an optical multi-resolution scanning apparatus for retrieving digital images representative of opaque or transparent objects including a reflective scanning platform capable of holding an opaque object for reflective scanning; a transmissive scanning platform capable of holding a transparent object for transmissive scanning; an optical sensor; a dual-lens assembly comprising a first, relatively high resolution lens and a second, relatively low resolution lens; a first optical pathway including a plurality of mirrors defining an optical path from said reflective scanning platform to said optical sensor through said first lens; a second optical pathway including a plurality of mirrors defining an optical path from said reflective scanning platform to said optical sensor through said second lens; a third optical pathway including a plurality of mirrors defining an optical path from said transmissive scanning platform to said optical sensor through said first lens; a fourth optical pathway including a plurality of mirrors defining an optical path from said transmissive scanning platform to said optical sensor through said second lens; a first optical switch adapted to alternate between a reflective scanning mode and a transmissive scanning mode; and a second optical switch adapted to alternate between said first and second optical pathways, or between said third and fourth optical pathways.

The optical sensor is aligned with the optical pathways; the optical pathways being selectively aligned with the reflective and transmissive scanning platforms in a high or low resolution scanning mode such that the control circuit receives corresponding high or low resolution images of objects being scanned.

An optical switch mirror having an axle attached to a frame secured to the base of the scanner chassis is provided such that rotation of the axle pivotally changes the angular displacement of the optical switch mirror to switch between usage of the relatively low resolution lens and the relatively high resolution lens.

A transmissive/reflective mode optical switch mirror is also provided such that rotation of its axle provides for switching between transmissive and reflective modes of operation and corresponding optical pathways.

Other features and advantages of the invention will become apparent upon review of the appended drawings and detailed description of the invention.

BRIEF DESCRIPTION OF THE DRAWINGS

The objects and advantages of the present invention will become more readily apparent to those ordinarily skilled in the art after viewing the following detailed description and accompanying drawings wherein:

FIG. 1 is a perspective view of the optical scanner of the present invention.

FIG. 2 is a cut-away side view of the optical scanner of FIG. 1 taken along line 2—2.

DETAILED DESCRIPTION

Figure 3:
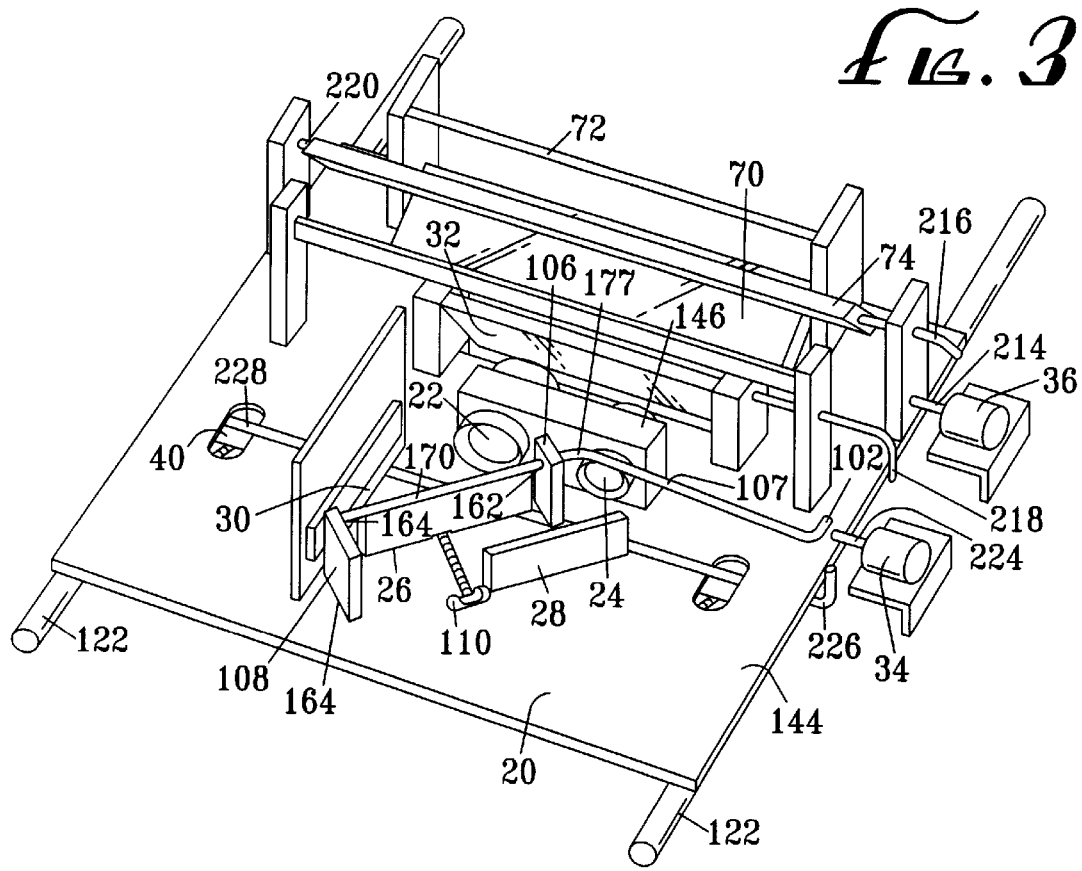
FIG. 3 is an exploded, partial perspective view of the optical scanner of FIG. 2.

With reference to the figures for purposes of illustration, the present invention is generally a multi-resolution transmissive and reflective optical scanner as illustrated in FIG. 1. The scanner includes generally a conventional rectangular housing 130 with a conventional reflective scanning platform 132 and a docking port 136 to secure a transmissive scanning platform 138. Located on the back side of the housing, the scanner includes conventional plugs (not shown) for connecting the scanner to a power source and a standard interface port (not shown) for connection to a personal computer.

The reflective scanning platform 132 includes a rectangular platen 134, made of glass or other suitable material, and secured in an aperture within the upper surface of the housing. A lid 120, attached by a hinge to the rear end of the housing, covers the platen 134 during scanning and functions to block out ambient light.

Figure 10:
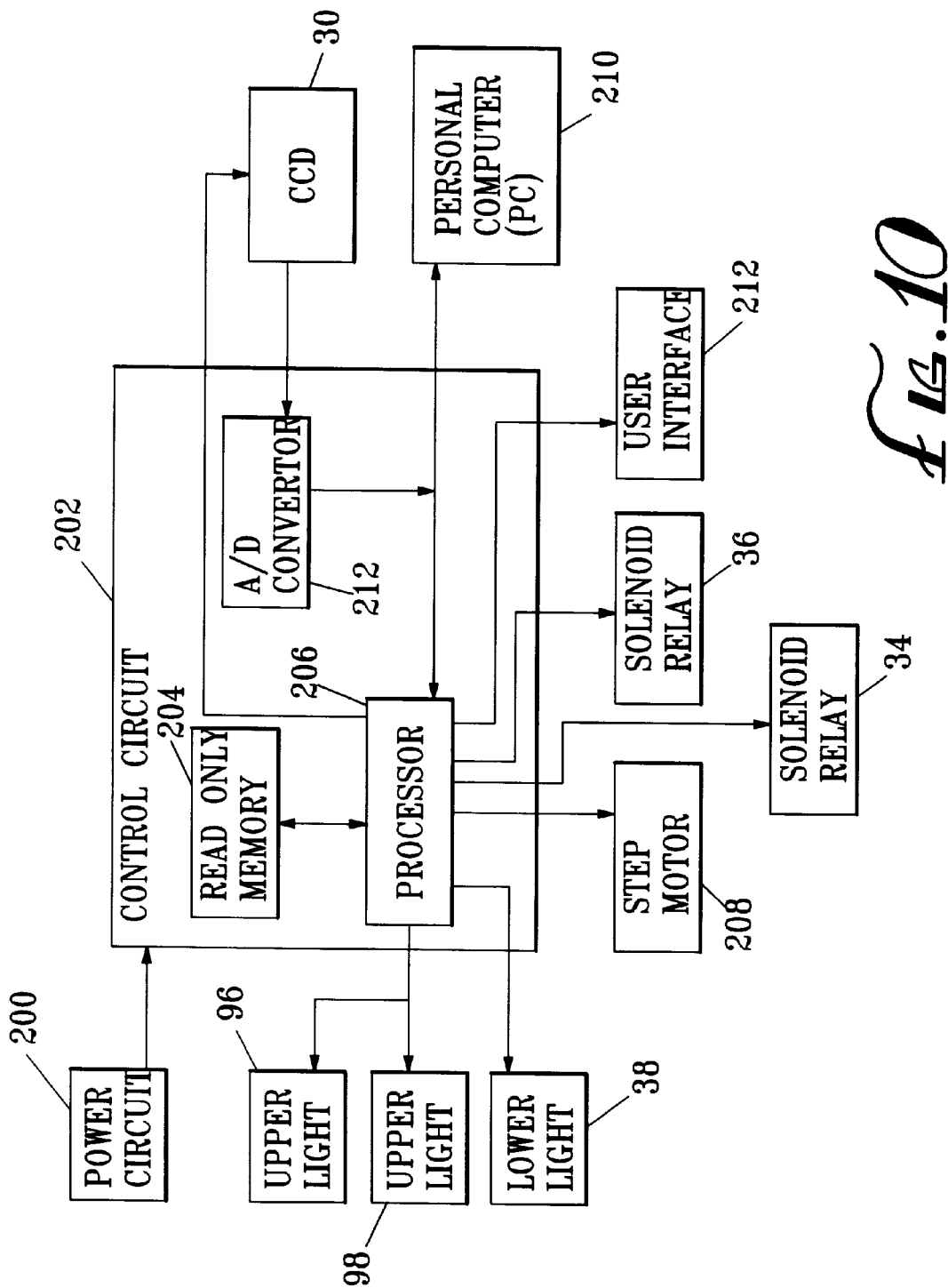
FIG. 10 is a block diagram of the control circuit connections of the present invention.

Referring to FIGS. 2–4 and 10, underlying the reflective scanning platform and mounted on a scanner chassis 144 (FIG. 3) are a plurality of collars 148 which are movably coupled to rails 122. Rails 122 run lengthwise in the interior of the scanner housing 130. An endless belt (not shown) extends lengthwise alongside the rails 122 and connects at opposite ends of the rails to a free moving pulley (not shown) and a pulley (not shown) connected conventionally to the drive shaft of a conventional step motor 208 (FIG. 10). The chassis 144 is conventionally secured to the endless belt by clamps. The step motor 208 is connected to a control circuit 202 which controls the rotation of the endless belt for positioning the chassis 144 at any point along the rails. The scanner is provided with an optical sensor which is a conventional CCD (charge-coupled device) 30 mounted at the left rear end of the chassis 144 proximate to a dual lens assembly which comprises a low resolution lens 22 and a high resolution lens 24 secured in a fixed lens housing 146 (FIG. 3). The lens housing 146 is bolted to the chassis base 20. The CCD 30 is electronically connected to a scanner control circuit 202 and transmits to the control circuit electrical signals representative of the images viewed during scanning operation.

Figure 5:
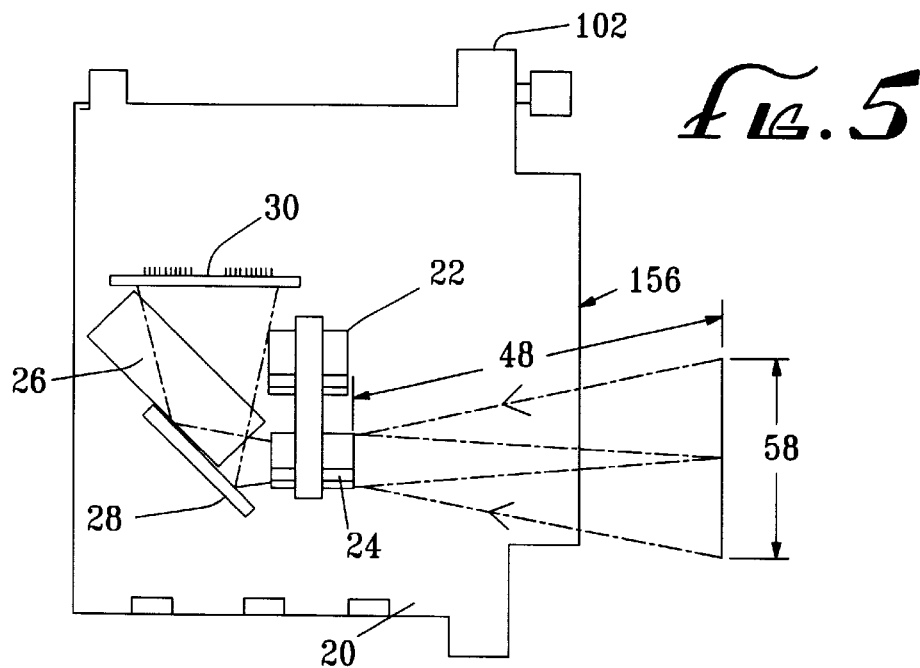
FIG. 5 is a diagrammatic top view of the optical sensor and dual lens assembly of the present invention showing the high resolution lens field of view and the corresponding focal length during high resolution optical scanning.
Figure 6:
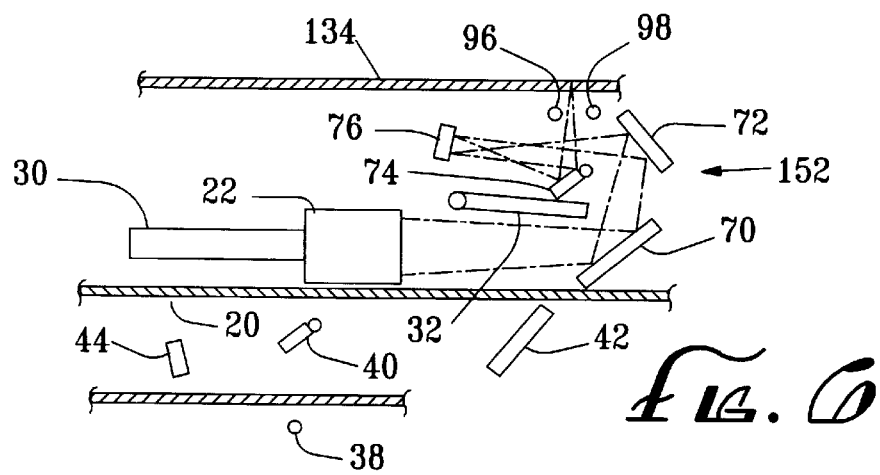
FIG. 6 is a diagrammatic side view of the optical sensor, low resolution lens and corresponding optical pathway showing the low resolution reflective scanning of an opaque object.
Figure 7:
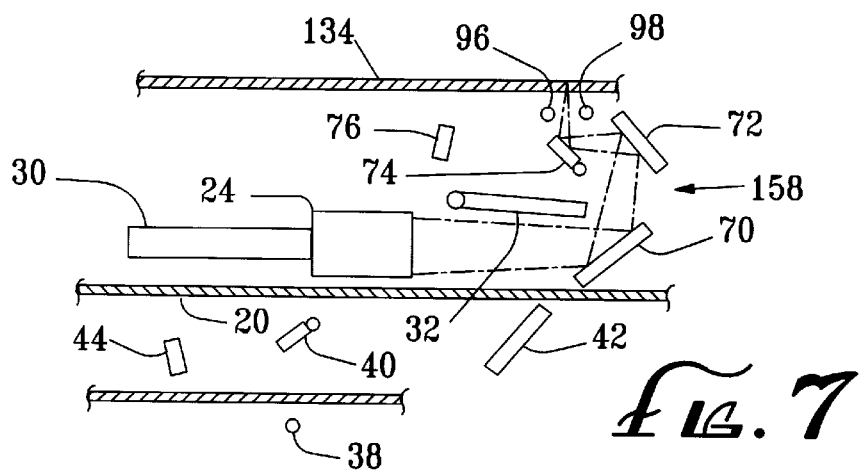
FIG. 7 is a diagrammatic side view of the optical sensor, high resolution lens and corresponding optical pathway showing the high resolution reflective scanning of an opaque object.

The field of view of the CCD 30 may be aligned with either low resolution (about 600 dpi) optical pathway 150 (shown in FIG. 4) provided with a reflective branch 152 (FIG. 6), transmissive branch 154 (FIG. 8) and an optical switch, i.e. flip mirror 26, or with high resolution (about 2000 dpi) optical pathway 156 (FIG. 5) provided with reflective branch 158 (FIG. 7), transmissive branch 160 (FIG. 9) and an optical switch, i.e. flip mirror 26. Optical switch mirror 26 switches between high and low resolution modes of scanning in each branch. In FIG. 3, mirror 26 is in the "down" position and set for low resolution scanning. Optical switch mirror 32, shown in FIG. 3, switches between reflective mode and transmissive mode of scanning. In FIGS. 6 and 7 mirror 32 is in the "up" position for reflective scanning mode and thus is not in the optical pathway during reflective scanning.

Low Resolution, Reflective Mode

Referring to FIG. 6, low resolution reflective branch 152 is defined by a plurality of precisely aligned fixed mirrors 70, 72 and 76 and movable switch mirror 74. The fixed mirrors 70, 72 and 76 are mounted onto the chassis conventionally with rubber mounts (not shown) to protect the mirrors during movement of the scanner. The mirrors are conventional, first surface reflective optical mirrors. The optical pathway functions as a periscope with the mirrors configured to provide remote viewing of an image by the CCD 30. An opaque object is placed on glass platen 134 for scanning. Two conventional light sources 96 and 98 mounted in the upper portion of the chassis under the platen shine light onto a portion of the object being scanned. The light reflected off the object is received by the reflective branch of optical pathway 150 via switch mirror 74, shown in the "down" position in FIG. 6. Switch mirror 74 in turn reflects the light onto fixed mirror 76 which reflects the light to fixed mirror 72 and from there onto fixed mirror 70 which reflects the light to low resolution lens 22. Lens 22 focuses and transmits the light to optical switch mirror 26, shown in the "down" (or low resolution mode) position in FIG. 4. Switch mirror 26 then reflects the light to CCD 30 which converts the image into electrical signals. The sum of the lengths of the portions of the low resolution reflective pathway 152 as described above, and shown on FIG. 6 corresponding to the field of view 60 (FIG. 4) of lens 22, is equal to the focal length 46 of low resolution lens 22.

Referring to FIG. 3, optical switch mirror 26 is rotatably coupled to the chassis through axle 170. Axle 170 extends at an angle across the chassis and projects through apertures 162 and 164 in mountings 106 and 108, which are secured to the base 20 of the chassis 144. Axle 170 includes a free end (or arm) 102 which extends away from the base of the chassis and bends at a right angle to extend upward into the cavity of the scanner housing. Switch mirror 26, is mounted to the axle 170, which in turn is connected through a conventional universal type joint, not shown, to free end 102 to provide for rotation of the mirror 26 when positioned at an acute angle from the direction of motion of chassis 144 along rails 122 during operation.

High Resolution, Reflective Mode

Referring to FIG. 7, high resolution reflective branch 158 is defined by a plurality of precisely aligned fixed mirrors 70, 72 and 28 and movable switch mirror 74. The optical pathway functions as a periscope with the mirrors configured to provide high resolution remote viewing of an image of an opaque object by the CCD 30. Reflected light from the portion of the object being scanned is received by switch mirror 74, shown in the "up" position in FIG. 7. The "up" position of mirror 74 prevents light reflection to fixed mirror 76, which was operational in the low resolution reflective mode (FIG. 6). Switch mirror 74 reflects the light onto fixed mirror 72 which reflects the light downward to fixed mirror 70 and from there onto high resolution lens 24 which focuses and transmits the same to fixed mirror 28 (FIG. 5). The switch mirror 26 is in the "up" position, as shown in FIG. 5, to be out of the optical path from fixed mirror 28 to CCD 30. Fixed mirror 28 then reflects the light to CCD 30 which converts the optical image into electrical signals. The sum of all lengths of the high resolution reflective pathway as described, and shown in FIG. 7 corresponding to the field of view 58 of lens 24, is equal to the focal length 48 of high resolution lens 24 (FIG. 5). It will be appreciated that the combination of mirrors used in branch 158 successfully corrects for the shorter focal length needed by high resolution lens 24 without movement of the lens assembly. The portion width 64 (FIG. 1) of the opaque object being scanned by the high resolution lens 24 is marked correspondingly on the outer surface of the glass platen and is smaller in size than the width 62 of the platen corresponding to low resolution lens 22. Therefore high resolution scanning covers only a portion of a document that otherwise may be entirely scanned by a single pass during low resolution scanning.

Fixed mirror 28 is conventionally mounted onto the base 20 of the scanner chassis 144 with rubber mounts (not shown) to protect the mirror during movement of the scanner. The mirror 28 is a conventional first surface reflective optical mirror. Optical pathway 158 functions as a periscope with the mirrors configured to provide remote high resolution scanning by the CCD 30 of a portion of or an entire opaque object.

Low Resolution, Transmissive Mode

Figure 8:
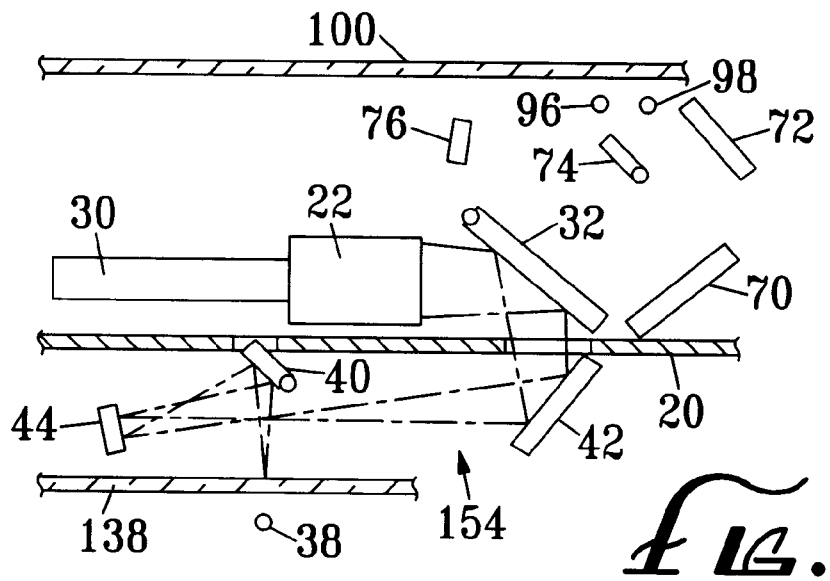
FIG. 8 is a diagrammatic side view of the optical sensor, low resolution lens and corresponding optical pathway showing the low resolution transmissive scanning of a transparent object.

Referring to FIG. 8, transmissive branch path 154 is defined by a plurality of precisely aligned fixed mirrors 44 and 42, movable mirror 40, and an optical switch defined by movable switch mirror 32. Switch mirror 32 is shown in the "down" position in FIGS. 8–9, where it is in the optical pathway for transmissive mode scanning. The fixed mirrors 44, 42 are mounted onto the chassis conventionally with rubber mounts (not shown) to protect the mirrors during movement of the scanner. The mirrors are conventional first surface reflective optical mirrors. The optical pathway functions as a periscope with the mirrors configured to provide remote low resolution scanning of a transparent object by the CCD 30. A transparent object is placed on movable platform 138 which is received by the docking port 136 on pair of tracks 124 for transmissive scanning. A light source 38 is mounted in the bottom portion of the chassis under the platform holder 138 to shine light through a portion of the transparent object being scanned. The light transmitted through the object is received by movable switch mirror 40, located under the base 20 of the chassis. Mirror 40 is in the "up" position as shown in FIG. 8. Switch mirror 40 in turn reflects the light onto fixed mirror 44 which reflects the light to fixed mirror 42 and from there to movable switch mirror 32 which reflects the light to low resolution lens 22. The light is then transmitted to optical switch mirror 26, shown in the "down" (or low resolution mode) position in FIG. 4. Switch mirror 26 then reflects the light to CCD 30 which converts the optical image into electrical signals. The sum of all lengths of the low resolution transmissive pathway as described, and shown on FIG. 8 corresponding to the field of view 60 (FIG. 4) of lens 22, is equal to the focal length 46 of low resolution lens 22.

High Resolution, Transmissive Mode

Figure 9:
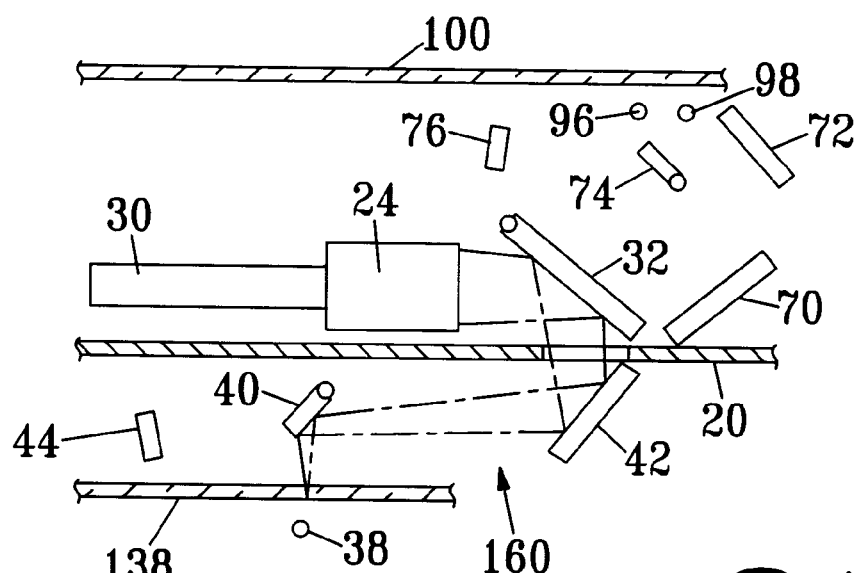
FIG. 9 is a diagrammatic side view of the optical sensor, high resolution lens and corresponding optical pathway showing the high resolution transmissive scanning of a transparent object.

Referring to FIG. 9, high resolution, transmissive branch 160 is defined by a plurality of precisely aligned fixed mirrors 28 and 42, movable mirror 40 and an optical switch defined by movable switch mirror 32. The optical pathway functions as a periscope with the mirrors configured to provide high resolution remote scanning of a portion of an entire transparent object by the CCD. Light transmitted through the portion of the object being scanned is received by switch mirror 40, shown in the "down" position in FIG. 9. The "down" position of mirror 40 blocks fixed mirror 44, which was operational in the low resolution transmissive mode, from receiving any reflected light. Switch mirror 40 reflects the light onto fixed mirror 42 which reflects the light upward to switch mirror 32 and from there into high resolution lens 24 which transmits the same to fixed mirror 28. The switch mirror 26 is in the "up" position as shown in FIG. 5 to be out of the optical path from fixed mirror 28 to the CCD 30. Fixed mirror 28 then reflects the light to CCD 30 which converts the optical image into electrical signals. The sum of all lengths of the high resolution reflective pathway as described above, and shown on FIG. 9 corresponding to the field of view 58 of lens 24, is equal to the focal length 48 of high resolution lens 24. It will be appreciated that the combination of mirrors used in branch 160 successfully corrects for the shorter focal length needed by high resolution lens 24, without movement of the lens.

The optical switch mirror 26 is toggled by the motor through a solenoid 34 (FIG. 3) between a first position, shown in FIG. 5 as a nearly horizontal position to be outside of the optical pathway 156 for high resolution scanning, and a second, precisely defined, position (shown in FIG. 4) within the optical pathway 150 for low resolution scanning. In this way the lenses being used for viewing by the CCD are changed, without actually moving the lens assembly relative to the chassis 144. This feature reduces manufacturing and maintenance costs of the apparatus.

Furthermore, the use of mirrors in the apparatus allows for only one critical position to be associated with each mirror, rather than two critical positions for each mirror as in conventional devices. This feature facilitates initial calibration of the mirrors and provides easy maintenance of the calibration of the mirrors during use.

The scanner includes a conventional power circuit 200 connected to control circuit 202, FIG. 10. Control circuit 202 includes a Read Only Memory (ROM) 204, a processor 206 and an analog-to-digital (A/D) converter 212. ROM 204 is used for storing the scanner operation program that is operated by processor 206. Processor 206 is also connected to light sources 96, 98 and 38; step motor 208; solenoid relays 36 and 34; CCD 30; user interface 212; and with personal computer (PC) 210. The A/D convertor 212 is connected to CCD 30. The A/D convertor converts the analog signals into digital code. Conventional digital signal processing techniques may then be applied to the scanned image data by the scanner CPU to enhance the image. The image data is then sent to the PC 210 for further processing. The hardware configurations for these circuits may be of any conventionally available type presently used in conventional optical scanners.

Solenoid relay 36 (FIGS. 3, 10 and 12), also known as a plunger relay, includes a movable core (or plunger) 214 that extends out of one end of the solenoid relay in response to solenoid action caused by an electrical signal sent from the control circuit 202 to the solenoid relay. When the control circuit stops power to the solenoid relay, the movable core 214 is drawn back into solenoid 36. The movable core 214 of the solenoid relay is used to electrically toggle optical flip mirrors 74, 32 and/or 40.

The free arm (or end) 216 of the axle 220 of flip mirror 74 extends downward into the scanner housing away from the chassis. When the chassis is drawn across rails 122, the free arm 216 of axle 220 travels through the scanner housing alongside the chassis. The solenoid 36 is mounted within the scanner housing, such that the path of extended movable core 214, when in motion, will intersect with the path of free arm 216 of the axle 220 of flip mirror 74. Thus, when the free arm of the axle engages the solenoid relay core while the chassis is moving, the plunger 214 pushes the axle free arm 216 to cause axle 220 of mirror 74 to rotate and overcome the biasing force of the conventional loaded springs (not shown) of mirror 74 in a conventional manner. Thus, axle 220 rotates the switch mirror 74 to a precisely defined scanning position. As the chassis 144 continues to move along the rails 122, a toggle point is reached at which point the torque generated by the biasing force is reversed and solenoid 36 is turned off having accomplished the turning of the mirror. As solenoid 36 and the chassis 144 move relative to each other, mirror 74 is rotated from a position shown in solid line in FIG. 12, with the end 216 between toggle positions "1" and "2", to a position shown in dashed lines in FIG. 12, corresponding to the end 216 being between toggle positions "3" and "4".

The free arm (or end) 218 of the axle 222 (FIG. 12) of flip mirror 32 extends downward into the scanner housing away from the chassis 144. When the chassis is drawn across rails 122, the free arm 218 of axle 222 travels through the scanner housing alongside the chassis. The solenoid 36 is mounted within the scanner housing, such that the path of extended movable core 214, when in motion, can intersect with free arm 218 of the axle 222 of flip mirror 32. By engaging the solenoid relay, the plunger 214 pushes arm 218 to overcome the biasing force of the conventional loaded springs (not shown) of mirror 32, in a conventional manner, and rotates the mirror towards a precisely defined scanning position. The mirror 32 is thus rotated from a position shown in solid lines (FIG. 12), corresponding to free end 218 between toggle position "5" and "6", to a position shown in dashed lines in FIG. 12, corresponding to free end 218 being between toggle position "7" and "8". As the chassis moves along the rails 122, a toggle point is reached at which point the solenoid 36 is turned off.

The free arm (or end) 226 of the axle 228 (FIGS. 3 and 12) of flip mirror 40 extends upward into the scanner housing away from the chassis. When the chassis is drawn across rails 122, the free arm 226 of axle 228 travels through the scanner housing alongside the chassis. Solenoid 36 is mounted within the scanner housing, such that the path of extended movable core 214, when in motion, can intersect with free arm 226 of the axle 228 of flip mirror 40. By engaging the solenoid relay, the core 214 pushes the axle free arm (end) 226 to overcome the biasing force of the conventional loaded springs (not shown) of mirror 40, in a conventional manner, and rotates the mirror towards a precisely defined scanning position, from the position shown in solid lines in FIG. 12, corresponding to the free arm 226 being between position "9" and "10", to the position shown in dashed lines, corresponding to the free arm 226 being between toggle position "11" and toggle position "12". As the chassis moves along the rails 122, a toggle point is reached at which point the solenoid 36 is turned off.

Figure 12:
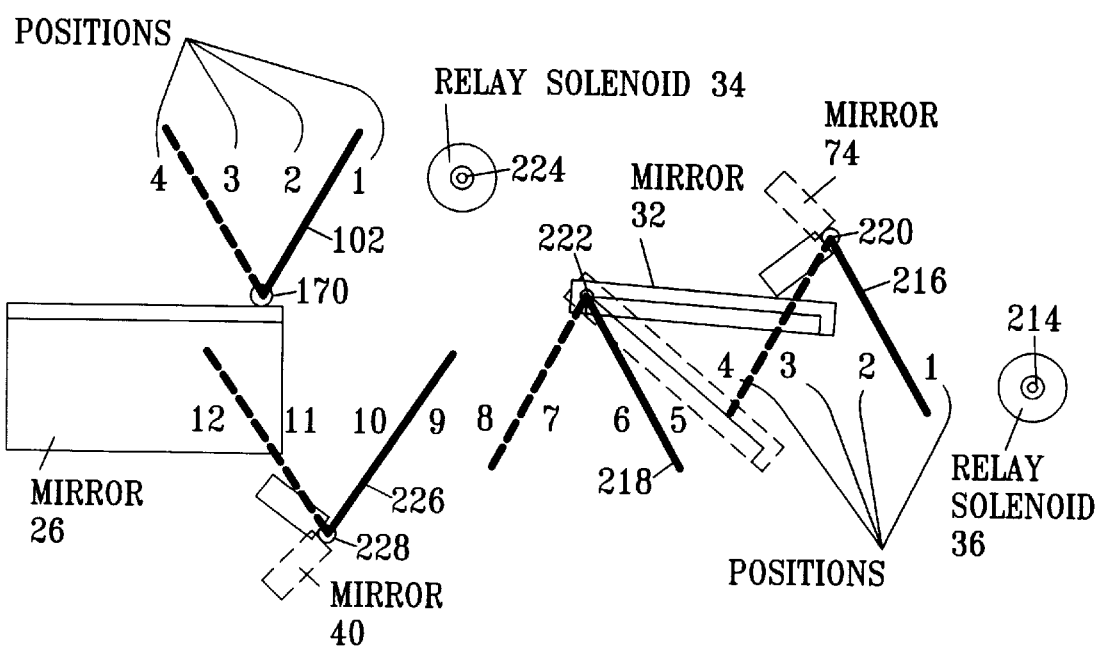
FIG. 12 is a schematic drawing illustrating toggle positions of the chassis associated with various mirror configurations of the scanner in FIG. 1.

Solenoid relay 34, also known as a plunger relay, includes a movable core (or plunger) 224 (FIGS. 3 and 12) that extends out of one end of the solenoid relay in response to solenoid action caused by an electrical signal sent from the control circuit 202 to the solenoid relay. When the control circuit stops power to the solenoid relay, the movable core 224 is drawn back into solenoid 34. The movable core of the solenoid relay is used to electrically toggle optical flip mirror 26 (FIG. 3). The free arm (or end) 102 of the axle 170 of flip mirror 26 extends into the scanner housing away from the chassis 144. When the chassis is drawn across rails 122, the free arm 102 of axle 170 travels through the scanner housing alongside the chassis. The solenoid 34 is mounted within the scanner housing, such that the path of its extended movable core 224, when in motion, intersects with free arm 102 of the axle 170 of flip mirror 26. By engaging the solenoid relay, the core 224 pushes the axle free arm 102 to rotate it and to overcome the biasing force of the conventional loaded spring 110 (FIG. 3) of mirror 26, in a conventional manner, so that the mirror 26 is rotated to a precisely defined scanning position. As shown in FIG. 12, free end 102 is moved from between toggle positions "1" and "2" (solid line) to a position (dashed line) between toggle positions "3" and "4". Axle 170 is coupled to free end 102 through a conventional universal type joint at 177 (FIG. 3) to provide for rotation through the angle at which mirror 26 is positioned relative to the path of travel of chassis 144 on rails 122. As the chassis moves along the rails 122, a toggle point is reached at which point the solenoid 34 is turned off.

Operation of solenoid relays 34 and 36 and control of the three conventional light sources 38, 96 and 98 is accomplished by means of a platform selection routine included within the scanner software stored in the ROM 204. Button or other control switches included on the surface of the scanner provide a user interface 212 which allows the operator to activate the platform selection routine to select a desired scanning mode. Scanning mode selection is also possible from a personal computer (PC) 210, connected to the scanner, and which has commercial scanning software compatible with the scanner. Before operation of the scanner as described above, the scanner is connected to a conventional power outlet (not shown).

Figure 11A:
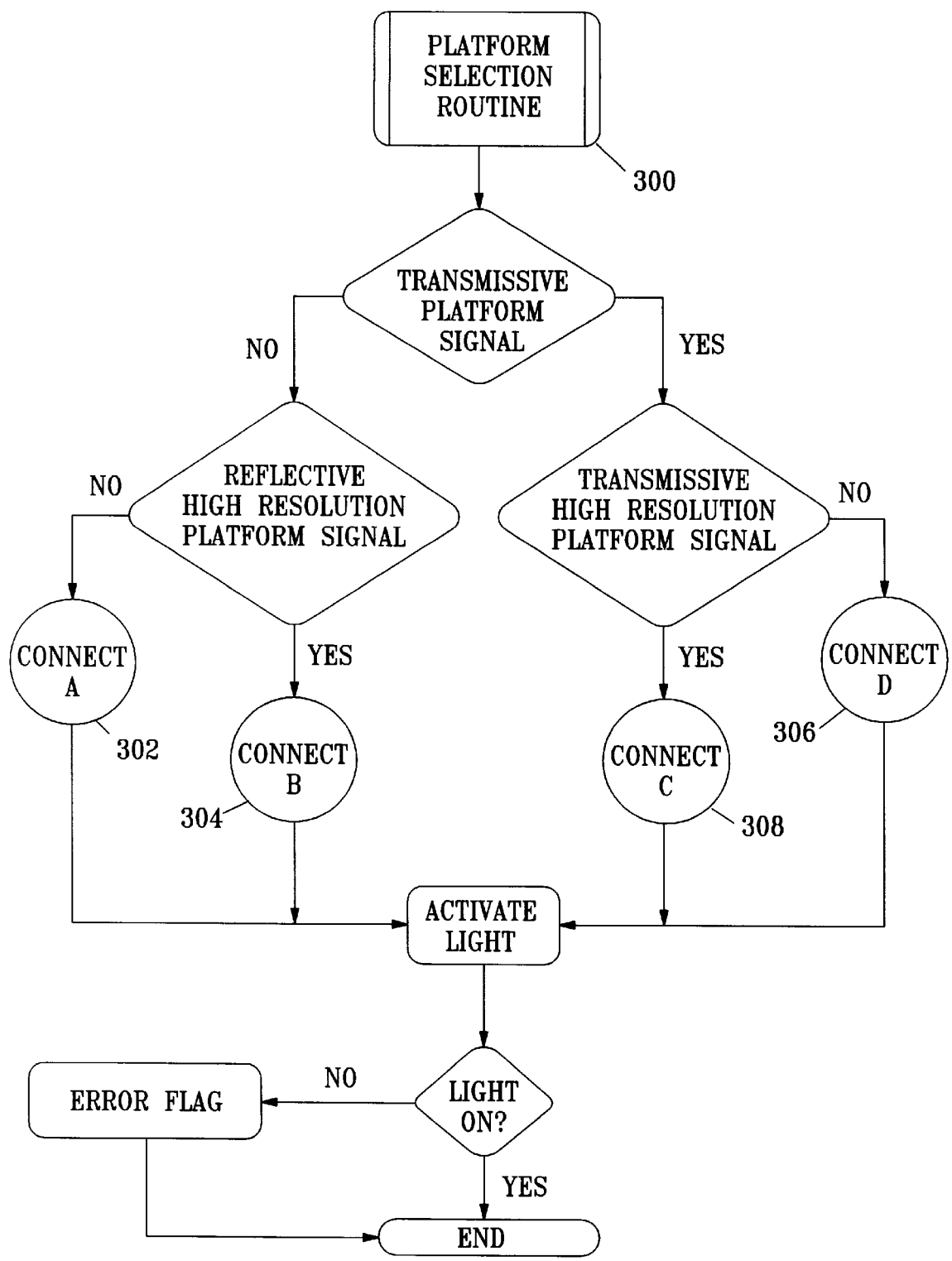
FIG. 11a is a generalized flow chart of the scanning platform selection routine of the present invention.

In the preferred embodiment of the present invention, a selection signal is sent to the processor 206 of the control circuit 202, which in response activates the platform selection routine 300, FIG. 11a. The platform selection routine includes four subroutines, viz., a low resolution reflective platform subroutine 302, a high resolution reflective platform subroutine 304, a low resolution transmissive platform subroutine 306, and a high resolution transmissive platform subroutine 308. The selection signal is thus capable of signalling at four different signal levels, i.e., a low resolution reflective signal, a high resolution reflective signal, a low resolution transmissive signal, and a high resolution transmissive signal whereby each signal performs the corresponding subroutine and activates the appropriate light source(s) as shown in FIG. 11a.

Low Resolution Reflective Subroutine

Figure 4:
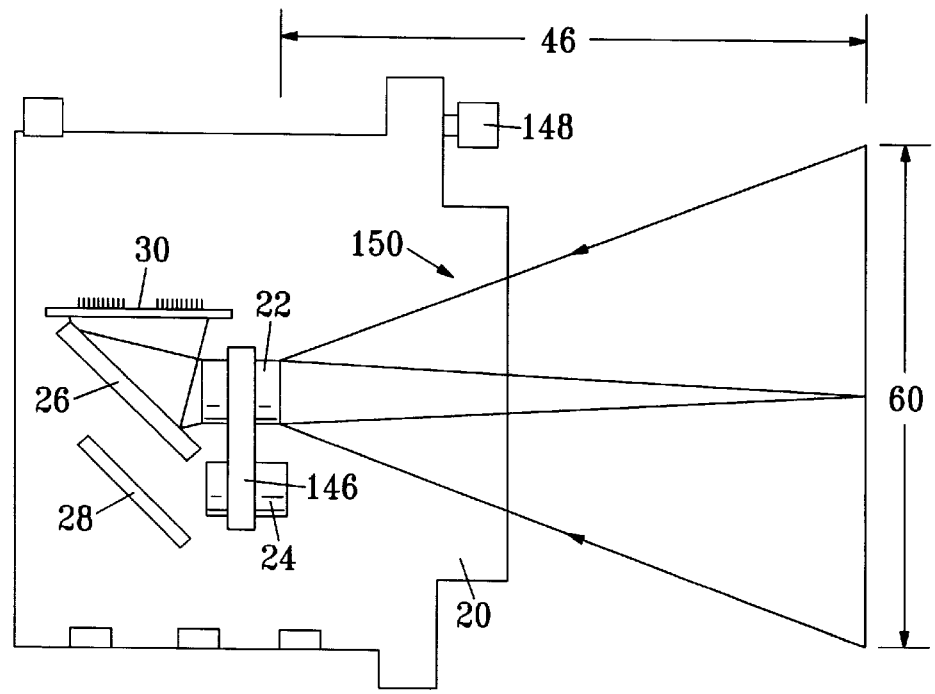
FIG. 4 is a diagrammatic top view of the optical sensor and dual lens assembly of the present invention showing the low resolution lens field of view and the corresponding focal length during low resolution optical scanning.
Figure 11B:
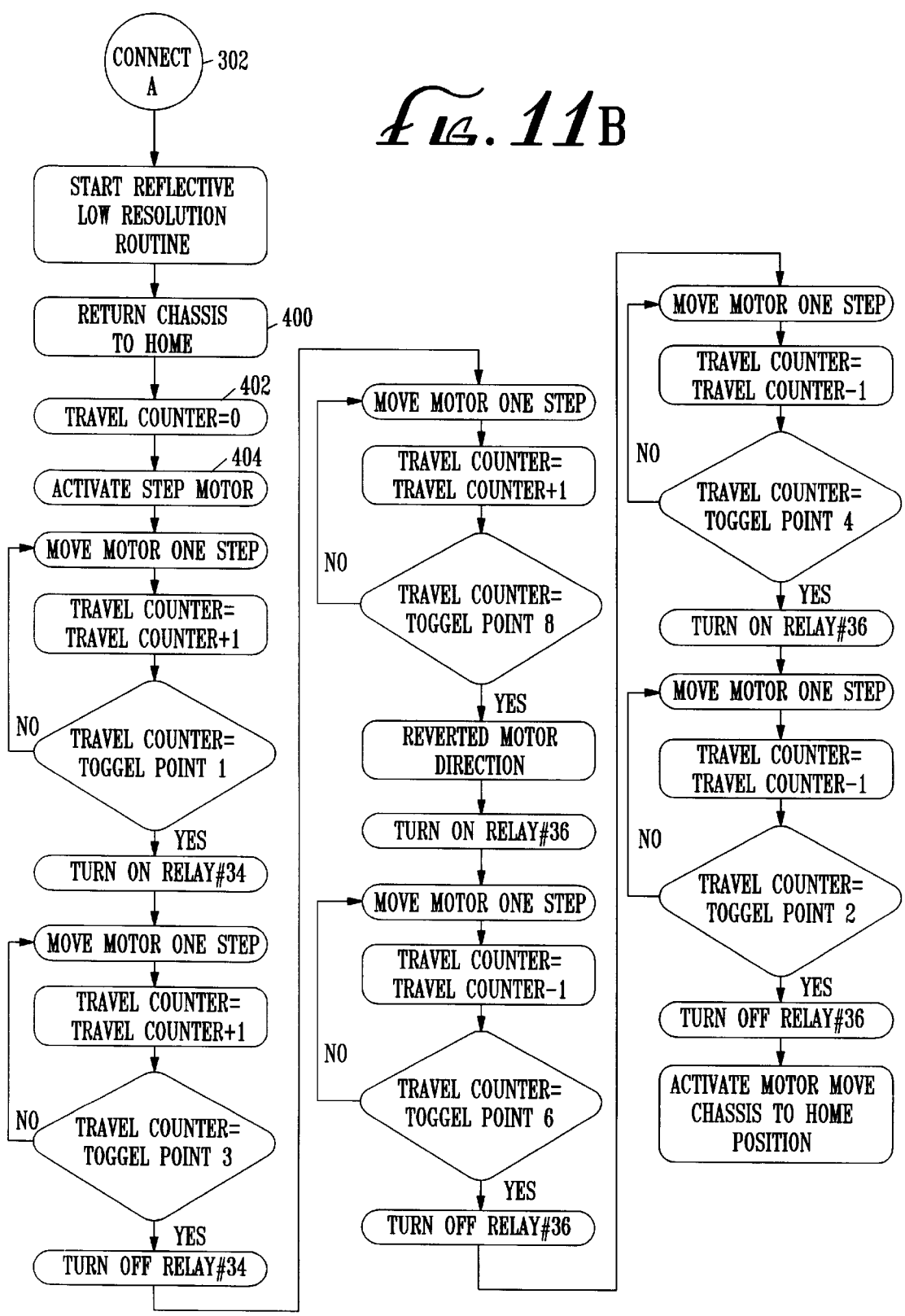
FIG. 11b is a flow chart of the low resolution reflective scanning subroutine of the present invention.

The low resolution reflective subroutine 302 activates the step motor 208 to return the chassis 144 to a home position 400, FIG. 11b, along the rails 122 proximate to the front end of the scanner. A travel counter 402 is initialized and tracks the movement of the chassis along the rails by counting the incremental rotation of the step motor drive shaft which is about two hundred (200) steps per rotation. The step motor is then activated, step 404 in FIG. 11b, to move the chassis along the rails 122 towards the rear of the scanner housing. Upon reaching toggle point 1 (FIGS. 11b and 12), solenoid relay 34 is turned on, i.e. its core 224 is extended out into the path of the axle free arm (end) 102 of the axle 170 of switch mirror 26. If switch mirror 26 is configured for high resolution scanning, its axle free arm 102 will eventually engage solenoid core 224 as the chassis moves towards the rear of the scanner housing. By engaging the solenoid relay, the plunger 224 pushes the axle free arm (end) 102 to overcome the biasing force of the conventional loaded spring 110 and rotates the mirror towards a precisely defined low resolution scanning position shown in dashed lines in FIG. 12. The axle free arm (end) 224 As the chassis continues to move along the rails 122, a toggle point 3 (FIG. 11b) is reached at which point solenoid 34 is turned off, FIG. 11b. Mirror 26 is now configured, as shown in FIG. 4, in the "down" position and is ready for low resolution scanning.

Having set switch mirror 26 to the desired low resolution scanning position, the chassis continues to move towards the rear of the housing. Upon reaching toggle point 8, the step motor direction is reversed and solenoid relay 36 is turned on, i.e. its core 214 is extended out into the path of the axle free arm (end) 218 of switch mirror 32. If switch mirror 32 is configured for transmissive scanning, its axle free arm will eventually engage solenoid core 214 as the chassis moves towards the front of the scanner housing. By engaging the solenoid relay, the core 214 pushes the axle free arm (end) 218 to overcome the biasing force of the conventional loaded springs of mirror 32 and rotates mirror 32 towards a precisely defined reflective scanning position. As the chassis continues to move along the rails 122, a toggle point 6 (FIG. 11b) is reached at which point the solenoid 36 is turned off, FIGS. 11b and 12.

Having set switch mirror 32 to the desired reflective scanning position, the chassis continues to move towards the front of the housing. Upon reaching toggle point 4, solenoid relay 36 is turned on, i.e. core 214 is extended out into the path of the axle free arm (end) 216 of switch mirror 74. If switch mirror 74 is configured for high resolution scanning, its axle free arm 216 will eventually engage solenoid core 214 as the chassis moves towards the front of the scanner housing. By engaging the solenoid relay, the core 214 pushes the axle free arm (end) 216 to overcome the biasing force of the conventional loaded springs of mirror 74 and rotates the mirror towards a precisely defined low resolution scanning position. As the chassis continues to move along the rails 122, a toggle point 2 (FIG. 11b) is reached and solenoid 36 is turned off, FIG. 11b. The step motor is then activated to return the chassis to its home position proximate to the front end of the scanner housing. The upper two light sources 96 and 98 are then turned on, FIG. 11a and FIG. 6. Reflected light from an opaque object being scanned is transmitted through low resolution reflective optical branch 152, low resolution lens 22 and optical switch 26 to the CCD 30. The control circuit then checks the CCD to ensure that light is being received. If light is received, the scanner can then begin conventional low resolution reflective scanning of an opaque object placed on platen 134. If light is not received, an error flag (message) is generated, FIG. 11a, indicating that the light from the upper two light sources has not been received. It will be appreciated that if any one of the above mirrors is already positioned for low resolution reflective scanning, the free end of its axle will not engage the corresponding solenoid core when the core is extended upon passing a corresponding toggle point.

High Resolution Reflective Subroutine

Figure 11C:
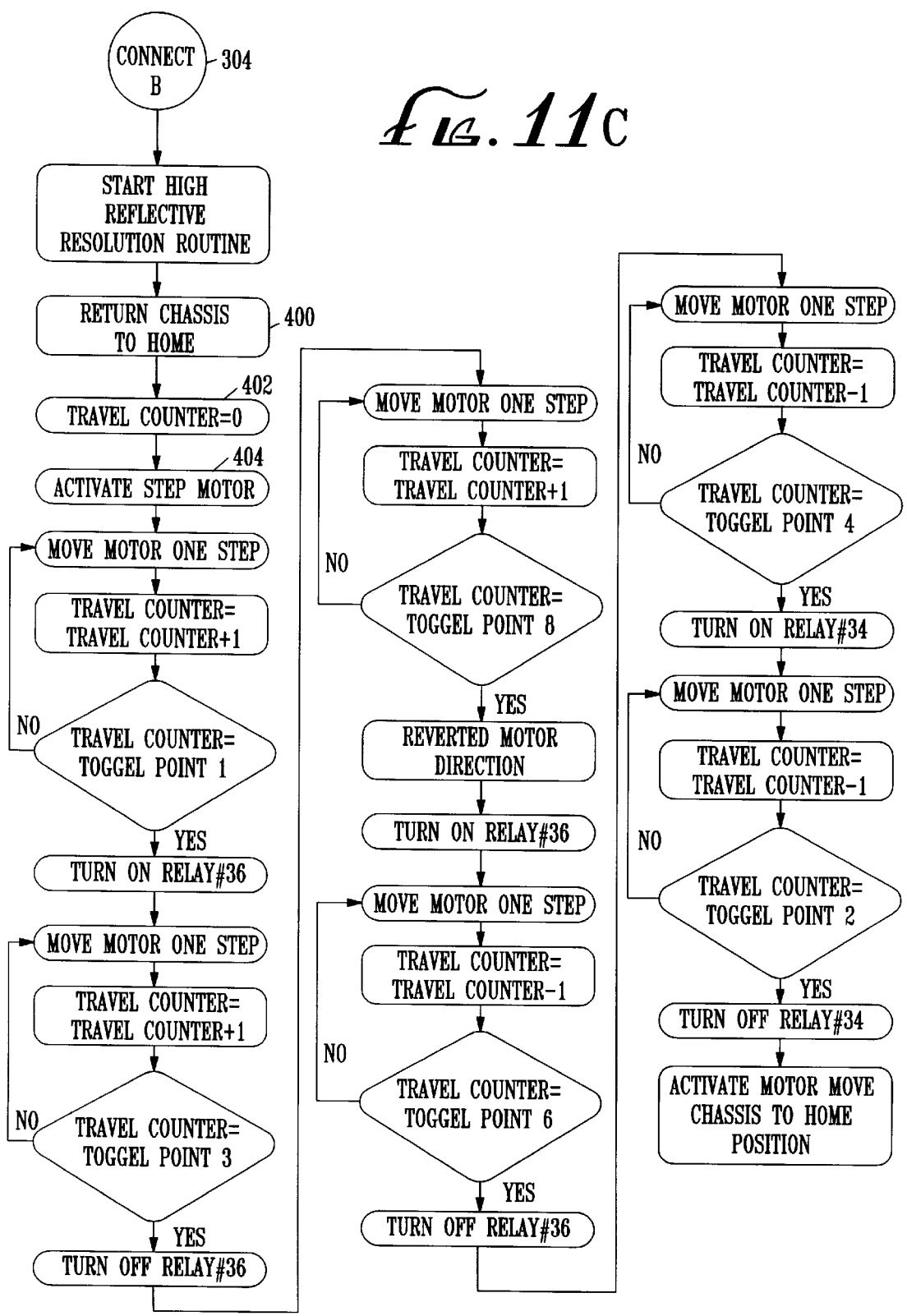
FIG. 11c is a flow chart of the high resolution reflective scanning subroutine of the present invention.

The high resolution reflective subroutine 304 (FIG. 11c) activates the step motor 208 to return the chassis 144 to a home position 400, FIG. 11c, along the rails 122 proximate to the front end of the scanner. A travel counter 402 is initialized and tracks the movement of the chassis along the rails by counting the incremental rotation of the step motor drive shaft which is about two hundred (200) steps per rotation. The step motor is then activated, step 404 in FIG. 11c, to move the chassis along the rails 122 towards the rear of the scanner housing. Upon reaching toggle point 1 (FIG. 11c), solenoid relay 36 is turned on, i.e. its core 214 is extended out into the path of the axle free arm (end) 216 of switch mirror 74. If switch mirror 74 is configured for low resolution scanning, its axle free arm 216, which in this mode extends downward toward the rails 122, FIG. 3, will eventually engage solenoid core 214 as the chassis moves towards the rear of the scanner housing. By engaging the solenoid relay, the core 214 pushes the axle free arm (end) 216 to overcome the biasing force of the conventional springs of mirror 74 and rotates mirror 74 towards a precisely defined high resolution scanning position. As the chassis continues to move along the rails 122, a toggle point 3 (FIGS. 11c and 12) is reached by the core 214 at which point solenoid 36 is turned off, FIG. 11c.

Having set switch mirror 74 to the desired high resolution position, the chassis continues to move towards the rear of the housing to toggle point 8. Upon reaching toggle point 8, the motor direction is reversed, the counter now counts back, and the solenoid relay 36 is turned on, i.e. its core 214 is extended out into the path of the axle free arm (end) 218 of switch mirror 32. If switch mirror 32 is configured for transmissive scanning, its axle free arm will eventually engage solenoid core 214 as the chassis moves towards the front of the scanner housing. By engaging the solenoid relay, the core 214 pushes the axle free arm (end) 218 to overcome the biasing force of the conventional springs of mirror 32 and rotates mirror 32 towards a precisely defined reflective scanning position. As the chassis continues to move along the rails 122, a toggle point 6 (FIGS. 11c and 12) is reached at which point the solenoid 36 is turned off, FIG. 11c.

Having set the flip mirror 32 to the desired reflective scanning position, the chassis is then moved to toggle point 4, and solenoid 34 is turned on, i.e. core 224 is extended out into the path of the axle free arm (end) 102 of switch mirror 26. If switch mirror 26 is configured for low resolution scanning, its axle free arm 102 will eventually engage solenoid core 224 as the chassis moves towards the front of the scanner housing. By engaging the solenoid relay, the core 224 pushes the axle free arm (end) 102 to overcome the biasing force of the conventional loaded spring 110 of mirror 26 and rotates the mirror towards a precisely defined high resolution scanning position. As the chassis continues to move along the rails 122, a toggle point 2 is reached, solenoid 34 is turned off and the chassis is returned to the home position. The upper two light sources 96 and 98 are then turned on, FIG. 11a and FIG. 6. If the above mirrors are properly positioned and the light sources are functioning, reflected light off an opaque object being scanned is transmitted through high resolution reflective optical branch 158, high resolution lens 24 and optical switch 26 to the CCD 30. The control circuit then checks the CCD to ensure that light is being received. If the light is received, the scanner can then begin conventional high resolution reflective scanning of an opaque object placed on platen 134. If light is not received, an error flag (message) is generated, FIG. 11a, indicating that the light from the upper two light sources has not been received. It will be appreciated that if any one of the above mirrors is already positioned for high resolution reflective scanning, the free end of its axle will not engage the corresponding solenoid core when the core is extended upon passing a corresponding toggle point.

High Resolution Transmissive Subroutine

Figure 11D:
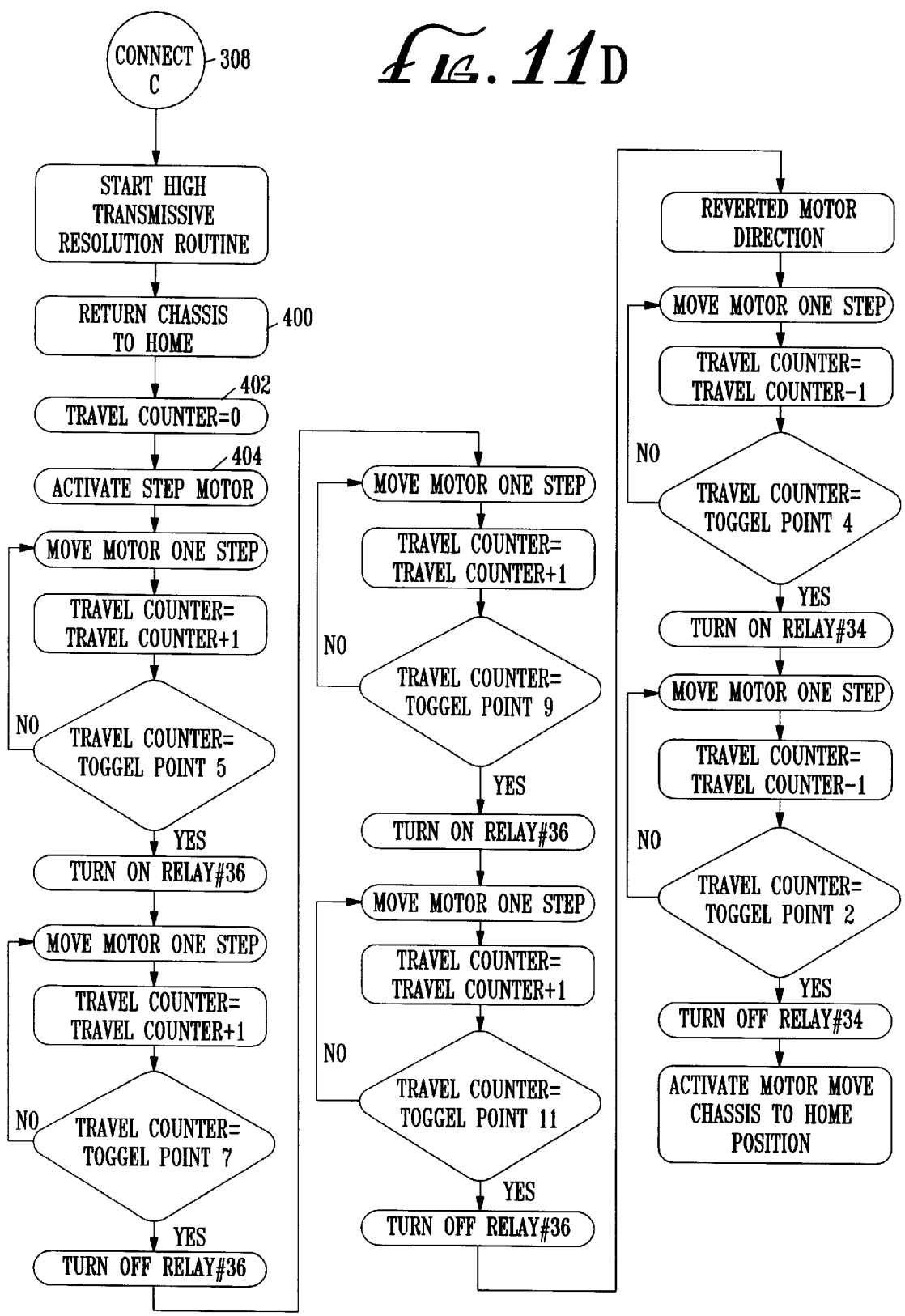
FIG. 11d is a flow chart of the high resolution transmissive scanning subroutine of the present invention.

The high resolution transmissive subroutine 308, FIG. 11d, activates the step motor 208 to return the chassis 144 to a home position 400, FIG. 11d, along the rails 122 proximate to the front end of the scanner. A travel counter 402 is initialized and tracks the movement of the chassis along the rails by counting the incremental rotation of the step motor drive shaft which is about two hundred (200) steps per rotation. The step motor is then activated, step 404 in FIG. 11d, to move the chassis along the rails 122 towards the rear of the scanner housing. Upon reaching toggle point 5 (FIG. 11d), the solenoid relay 36 is turned on, i.e. its core 214 is extended out into the path of the free arm (end) 218 of the axle 222 of switch mirror 32. If switch mirror 32 is configured for reflective scanning, its axle free arm 218 will eventually engage solenoid core 214 as the chassis moves towards the rear of the scanner housing. By engaging the solenoid relay, the core 214 pushes the axle free arm (end) 218 to overcome the biasing force of the conventional loaded springs of mirror 32 and rotates the mirror towards a precisely defined transmissive scanning position. As the chassis continues to move along the rails 122, a toggle point 7 (FIG. 11d) is reached at which point the solenoid 36 is turned off, FIG. 11d.

Having set switch mirror 32 to the desired transmissive scanning position, the chassis continues to move towards the rear of the scanner housing. Upon reaching toggle point 9, the solenoid relay 36 is turned on, i.e. its core 214 is extended out into the path of the axle free arm (end) 226 of switch mirror 40. If switch mirror 40 is configured for low resolution scanning, its axle free arm will eventually engage solenoid core 214 as the chassis moves towards the rear of the scanner housing. By engaging the solenoid relay, the core 214 pushes the axle free arm (end) 226 to overcome the biasing force of the conventional loaded springs of mirror 40 and rotates the mirror towards a precisely defined high resolution scanning position. As the chassis continues to move along the rails 122, a toggle point 11 (FIG. 11d) is reached at which point solenoid 36 is turned off, FIG. 11d.

Having set switch mirror 40 to the desired high resolution scanning position, the step motor reverses direction of movement and moves the chassis to toggle point 4, at which point solenoid 34 is turned on, i.e. core 224 is extended out into the path of the axle free arm (end) 102 of switch mirror 26. If switch mirror 26 is configured for low resolution scanning, its axle free arm 102 will eventually engage solenoid core 224 as the chassis moves towards the front of the scanner housing. By engaging the solenoid relay, the core 224 pushes the axle free arm (end) 102 to overcome the biasing force of the conventional loaded spring 110 of mirror 26 and rotates the mirror towards a precisely defined "up" or high resolution scanning position. As the chassis continues to move along the rails 122, a toggle point 2 (FIG. 11d) is reached at which point solenoid 34 is turned off, FIG. 11d. The step motor is then activated to return the chassis to its home position proximate to the front end of the scanner housing. The lower light source 38 is then turned on, FIGS. 11a, 11d and FIG. 9. If the above mirrors are properly positioned and the light source is functioning, reflected light from a transparent object being scanned is transmitted through high resolution transmissive optical branch 160, high resolution lens 24 and optical switch 26 to the CCD 30. The control circuit then checks the CCD to ensure that light is being received. If the light is received, the scanner can then begin conventional high resolution transmissive scanning of a transparent object placed on platen 138. If light is not received, an error flag (message) is generated, FIG. 11a, indicating that the light from the lower light source has not been received. It will be appreciated that if any one of the above mirrors is already positioned for high resolution transmissive scanning, the free end of its axle will not engage the corresponding solenoid core when the core is extended upon passing a corresponding toggle point.

Low Resolution Transmissive Subroutine

Figure 11E:
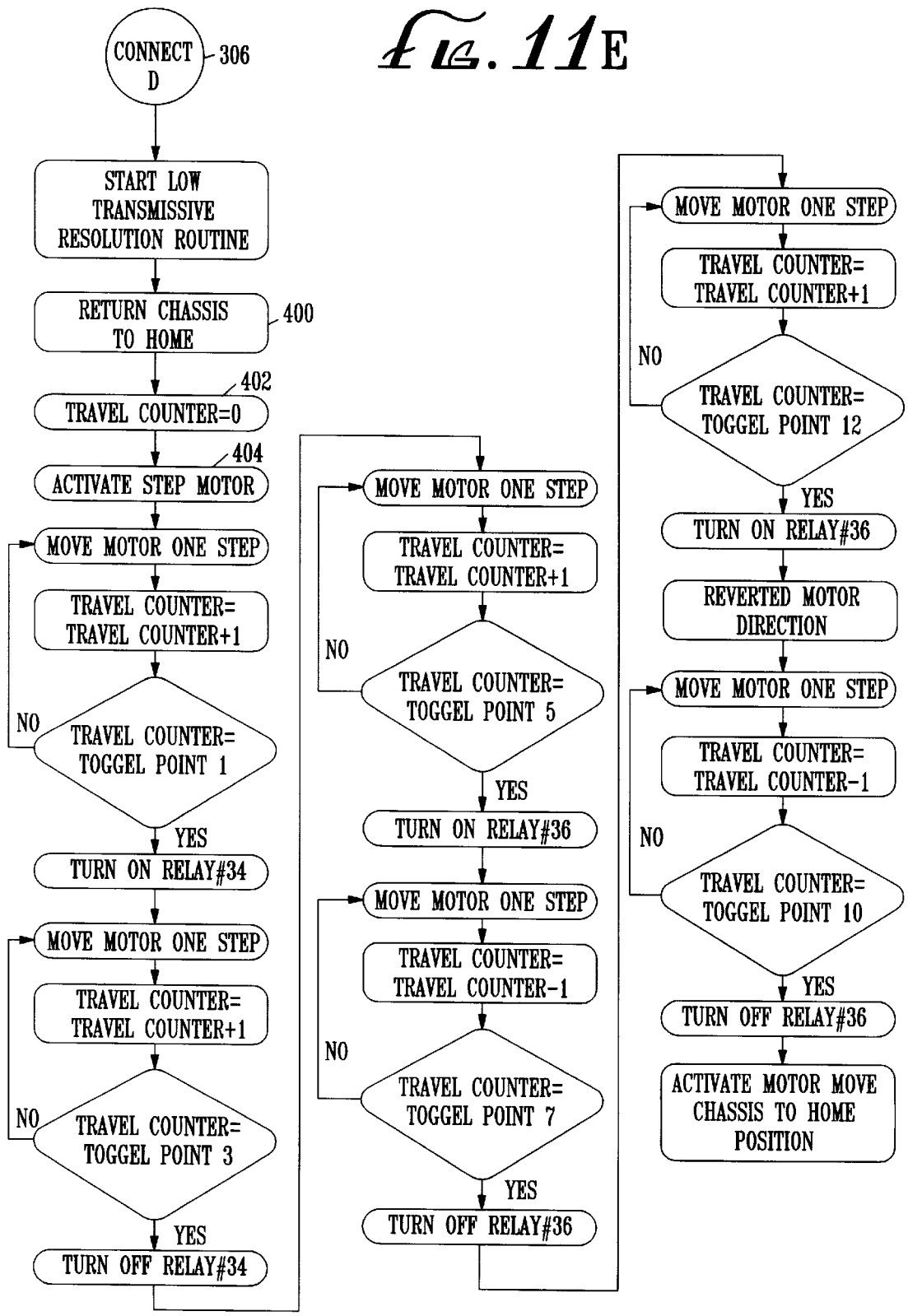
FIG. 11e is a flow chart of the low resolution transmissive scanning subroutine of the present invention.

The low resolution transmissive subroutine 306, FIG. 11e, activates the step motor 208 to return the chassis 144 to a home position 400, FIG. 11e, along the rails 122 proximate to the front end of the scanner. A travel counter 402 is initialized and tracks the movement of the chassis along the rails as described above. The step motor is then activated, step 404 in FIG. 11e, to move the chassis along the rails 122 towards the rear of the scanner housing. Upon reaching toggle point 1 (FIG. 11e), the solenoid relay 34 is turned on, i.e. its core 224 is extended out into the path of the free arm (end) 102 of switch mirror 26. If switch mirror 26 is configured for high resolution scanning, its axle free arm will eventually engage solenoid core 224 as the chassis moves towards the rear of the scanner housing. By engaging the solenoid relay, the core 224 pushes the axle free arm (end) 102 to overcome the biasing force of the conventional loaded spring 110 of mirror 26 and rotates the mirror towards a precisely defined low resolution ("down") scanning position. As the chassis continues to move along the rails 122, a toggle point 3 (FIG. 11*e*) is reached at which point the solenoid 34 is turned off, FIG. 11*e*.

Having set switch mirror 26 to the desired low resolution scanning position, the chassis continues to move forward towards the rear of the scanner housing. Upon reaching toggle point 5, the solenoid relay 36 is turned on, i.e. its core 214 is extended out into the path of the free arm (end) 218 of the axle 222 of switch mirror 32. If switch mirror 32 is configured for reflective scanning, its axle free arm 218 will eventually engage solenoid core 214 as the chassis moves towards the rear of the scanner housing. By engaging the solenoid relay, the core 214 pushes the axle free arm (end) 218 to overcome the biasing force of the conventional loaded springs of mirror 32 and rotates the mirror towards a precisely defined transmissive scanning position. As the chassis continues to move along the rails 122, a toggle point 7 (FIG. 11*e*) is reached at which point the solenoid 36 is turned off, FIG. 11*e*.

Having set switch mirror 32 to the desired transmissive scanning position, the motor moves the chassis forward towards the rear of the scanner housing to toggle position 12 at which point it turns on solenoid 36, i.e. core 214 is extended out into the path of the axle free arm (end) 226 of switch mirror 40, and reverses direction of movement. If switch mirror 40 is configured for high resolution scanning its axle free arm 226 will eventually engage solenoid core 214 as the chassis moves towards the front of the scanner housing. By engaging the solenoid relay, the core 214 pushes the axle free arm (end) 226 to overcome the biasing force of the conventional loaded springs of mirror 40 and rotates the mirror towards a precisely defined low resolution scanning position. As the chassis continues to move along the rails 122 towards the front of the scanner housing, a toggle point 10 is reached at which point solenoid 36 is turned off. The step motor is then activated to return the chassis to its home position proximate to the front end of the scanner housing. The lower light source 38 is then turned on, FIG. 11*d* and FIG. 8. If the above mirrors are properly positioned and the light source is functioning, reflected light from a transparent object being scanned is transmitted through low resolution transmissive optical branch 154, low resolution lens 22 and optical switch 26 to the CCD 30. The control circuit then checks the CCD to ensure that light is being received. If the light is received, the scanner can then begin conventional low resolution transmissive scanning of a transparent object placed on platen 138. If light is not received, an error flag (message) is generated, FIG. 11*a*, indicating that the light from the lower light source has not been received. It will be appreciated that if any one of the above mirrors is already positioned for low resolution transmissive scanning, the free end of its axle will not engage the corresponding solenoid core when the core is extended upon passing a corresponding toggle point.

It will be appreciated by those skilled in the art that fiber optic cable may be substituted for the above-described optical pathways and appropriate conventional fiber optical switches may be substituted for the above-described optical switches.

Finally, mechanical switches may be deployed on the outside of the scanner to substitute for the present electro-mechanical optical switches disclosed in the preferred embodiment of the present invention.

It will be understood that certain features and subcombinations are of utility and may be employed without reference to other features and subcombinations as they are outlined within the claims. While the preferred embodiment and application of the invention has been described, it is apparent to those skilled in the art that the objects and features of the present invention are only limited as set forth in the claims attached hereto.

What is claimed is:

1. An optical scanning apparatus for retrieving images representative of objects comprising:

a rectangular housing supporting a scanning platform capable of holding an object for scanning;

a chassis movably mounted within said housing;

an image optical sensor mounted on said chassis;

a lens assembly mounted on said chassis and comprising a first lens and a second lens;

a first optical pathway within said housing including a plurality of mirrors defining a first optical path from said scanning platform to said optical sensor through said first lens, a second optical pathway within said housing including a plurality of mirrors defining a second optical pathway from said scanning platform to said sensor through said second lens; and an optical switch adapted to alternate between said first optical pathway and said second optical pathway.

2. The optical scanning apparatus of claim 1 wherein the first of the two lenses is a relatively high resolution lens and the second of the two lenses is a relatively low resolution lens.

3. The optical scanning apparatus of claim 1 wherein said first lens is a focusing lens.

4. The optical scanning apparatus of claim 3 wherein said second lens is a focusing lens.

5. The optical scanning apparatus of claim 1 further comprising:

a cavity positioned within said housing and terminating in a slot in said housing; and a transmissive scanning platform insertable through said slot.

6. The optical scanning apparatus of claim 1 further including:

a motor adapted to move said chassis in a reciprocating motion within said housing; and a microprocessor and a computer implemented software application for controlling the operation of said motor in a reflective mode of operation.

7. The optical scanning apparatus of claim 1 wherein the optical switch includes a mirror rotatably mounted on an axle within said housing whereby pivoting said mirror about its axle provides for alternating between said pathways.

8. The optical scanning apparatus of claim 1 further including:

a motor adapted to move said carriage in a reciprocating motion within said housing; and a microprocessor and a computer implemented software application for controlling the operation of said motor in a transmissive mode of operation.

9. The optical scanning apparatus of claim 1 further including:

a motor adapted to move said chassis in a reciprocating motion within said housing; and a microprocessor and a computer implemented software application for controlling the operation of said motor in a relatively high resolution and in a relatively low resolution reflective mode of operation.

10. The scanning apparatus of claim 1 further including:

a motor adapted to move said chassis in a reciprocating motion within said housing; and a microprocessor and a computer implemented software application for controlling the operation of said motor in a relatively high resolution and in a relatively low resolution transmissive mode of operation.

11. The scanning apparatus of claim 1 further including:

a motor adapted to move said chassis in a reciprocating motion within said housing; and a plurality of solenoid switches adapted to operate said optical switch in response to movement of said carriage through a predetermined position relative to a reference position.

12. An optical multi-resolution scanning apparatus for retrieving digital images representative of transparent objects comprising:

a rectangular housing;

a transmissive scanning platform capable of holding an object for transmissive scanning;

a chassis movably mounted within said housing;

an image optical sensor mounted on said chassis;

dual-lens assembly mounted on said chassis and comprising:

a first, relatively high resolution lens and a second, relatively low resolution lens;

a first optical pathway within said housing and including a plurality of mirrors defining an optical path from said transmissive scanning platform to said optical sensor through said first lens;

a second optical pathway within said housing and including a plurality of mirrors defining an optical path from said transmissive scanning platform to said optical sensor through said second lens; and an optical switch adapted to alternate between said first optical pathway and said second optical pathway.

13. The optical scanning apparatus of claim 12 further comprising:

a cavity positioned within said housing and terminating in a slot in said housing; and a transmissive scanning platform insertable through said slot.

14. The optical scanning apparatus of claim 12 further including:

a motor adapted to move said chassis in a reciprocating motion within said housing; and a microprocessor and a computer implemented software application controlling the operation of said motor during a realatively high resolution mode of operation and during a relatively low resolution mode of operation.

15. The scanning apparatus of claim 12 further including:

a motor adapted to move said chassis in a reciprocating motion within said housing; and a plurality of solenoid switches adapted to operate said optical switch in response to movement of said carriage through a predetermined position relative to a reference position.

16. An optical multi-resolution scanning apparatus for retrieving digital images representative of opaque objects comprising:

a rectangular housing;

a reflective scanning platform capable of holding an opaque object for scanning;

a chassis movably mounted within said housing;

an image optical sensor mounted on chassis;

a dual lens assembly mounted on said chassis and comprising a first, relatively high resolution lens and a second, relatively low resolution lens;

a first optical pathway within said housing and including a plurality of mirrors defining an optical path from said reflective scanning platform to said optical sensor through said first lens;

a second optical pathway within said housing and including a plurality of mirrors defining an optical path from said reflective scanning platform to said optical sensor through said second lens; and an optical switch adapted to alternate between said first optical pathway and said optical pathway.

17. The optical scanning apparatus of claim 16 further comprising:

a motor adapted to move said chassis in a reciprocating motion within said housing; and a microprocessor and a computer implemented software application for controlling the operation of said motor during a relatively high resolution mode of operation and during a relatively low resolution mode of operation.

18. The scanning apparatus of claim 16 further including:

a motor adapted to move said carriage in a reciprocating motion within said housing; and a plurality of solonoid switches adapted to operate said optical switch in response to movement of said carriage through a predetermined position relative to a reference position.

19. An optical scanning apparatus for retrieving images representative of objects comprising:

a rectangular housing supporting a scanning platform capable of holding an object for scanning;

a chassis movable mounted within said housing;

an image optical sensor mounted on said chassis;

a lens assemble mounted on said chassis and comprising a first relatively high resolution lens and a second relatively low resolution lens;

a first optical pathway within said housing including a plurality of mirrors defining a first optical path from scanning platform to said optical sensor through said first lens;

a second optical pathway within said housing including a plurality of mirrors defining a second optical pathway from said scanning platform to said sensor through said second lens;

an optical switch adapted to alternate between said first optical pathway and said second optical pathway; and wherein the first of the two optical pathways includes a plurality of mirrors defining an optical path from a reflective scanning platform to said optical sensor through said relatively high resolution lens.

20. An optical scanning apparatus for retrieving images representative of objects comprising:

a rectangular housing supporting a scanning platform capable of holding an object for scanning;

a chassis movable mounted within said housing;

an image optical sensor mounted on said chassis;

a lens assemble mounted on said chassis and comprising a first relatively high resolution lens and a second relatively low resolution lens;

a first optical pathway within said housing including a plurality of mirrors defining a first optical path from scanning platform to said optical sensor through said first lens;

a second optical pathway within said housing including a plurality of mirrors defining a second optical pathway from said scanning platform to said sensor through said second lens;

an optical switch adapted to alternate between said first optical pathway and said second optical pathway; and wherein the second of the two optical pathways includes a plurality of mirrors defining an optical path from a reflective scanning platform to said optical sensor through said relatively low resolution lens.

* * * * *